Patented July 10, 1951

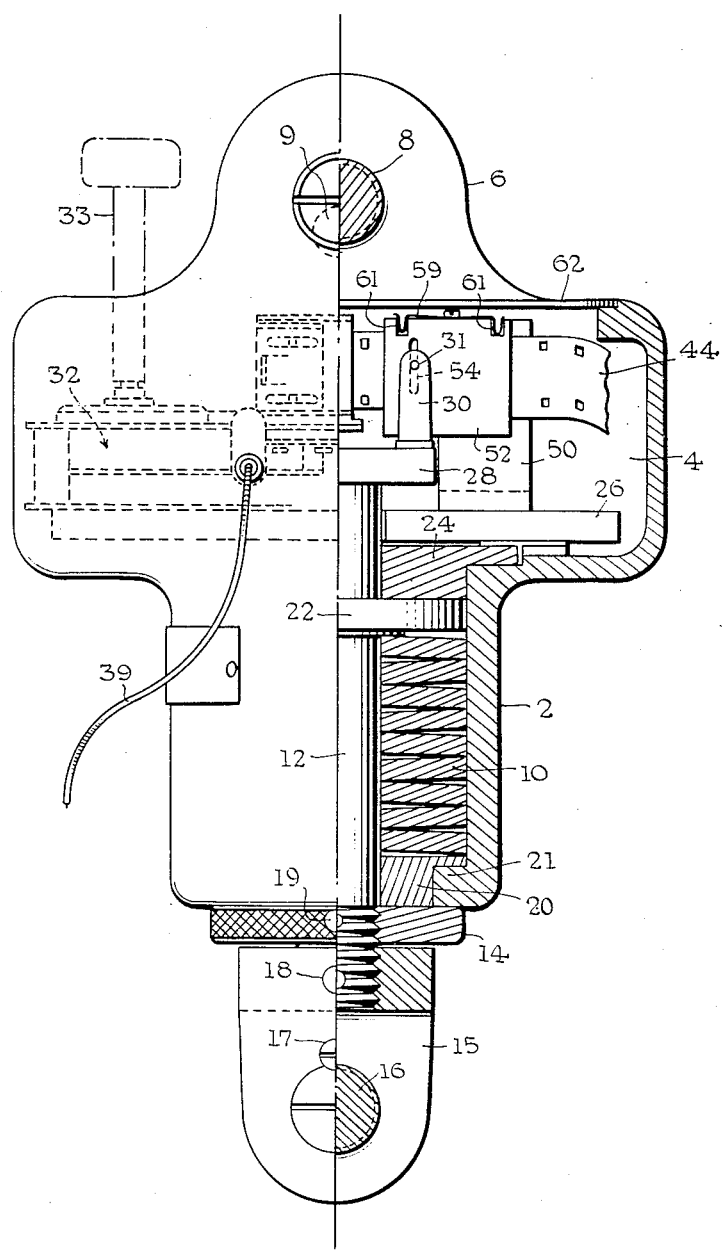

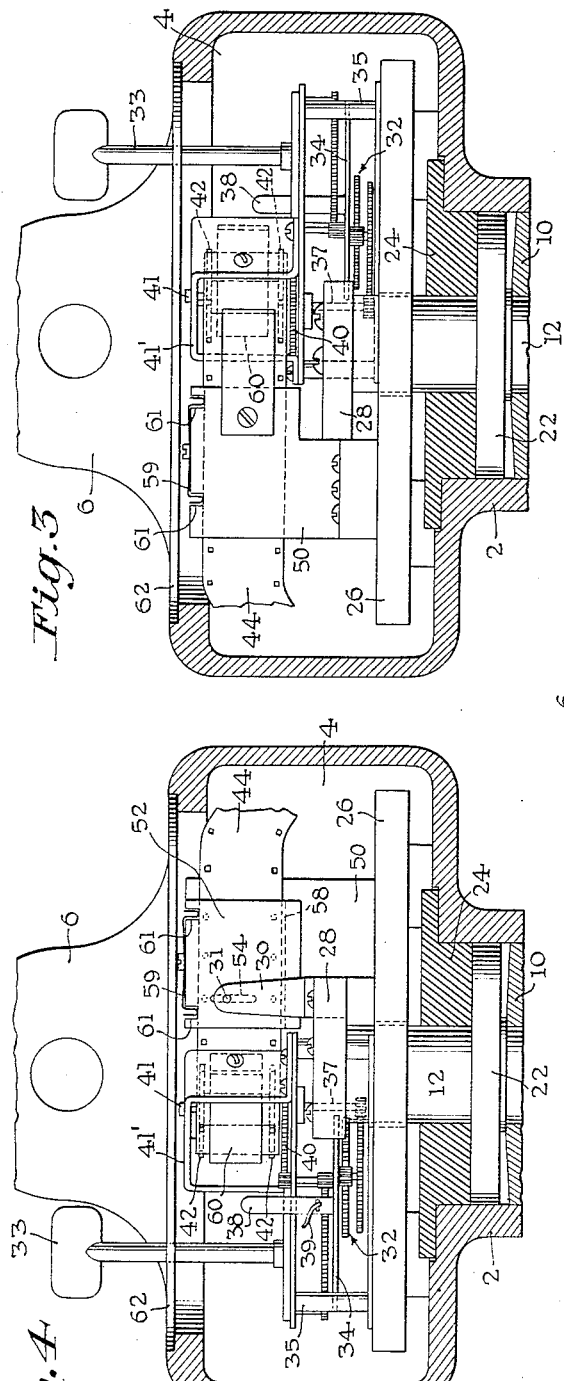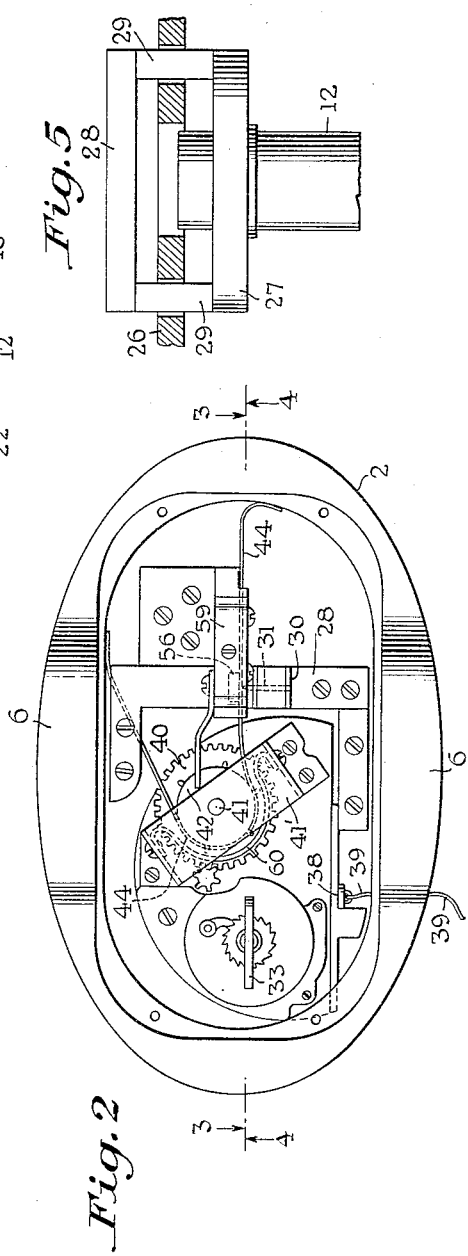

2,559,800

UNITED STATES PATENT OFFICE 2,559,800

TENSIOMETER

James J. Ryan, Jr., St. Paul, Minn.

Application December 29, 1945, Serial No. 638,088

3 Claims. (Cl. 73—141)

This invention is an instrument for recording large loads, particularly large impact loads. The instrument is small and compact, and is for permanently and accurately recording on film, or the like, suddenly applied impact loads in units of force and time. The particular instrument here described is for handling impact loads up to about 20,000 pounds.

An object of the present invention is to provide a testing instrument for recording in units of force and time on film or the like, the inertia forces of falling bodies stopped suddenly while in motion, such as in the opening of a parachute.

Another object is to provide an instrument for recording suddenly applied forces on tow lines attached to ships, barges or the like.

Still another object is to provide an instrument which will record the live load forces encountered in buildings, bridges and other structures, the instrument being placed in series with the rods or connectors and so subjected to such forces.

Still another object is to provide an instrument which will record the forces applied to cables used on cranes, hoists, or elevators.

A still further object is to provide an instrument which will record large loads and forces due to dynamic conditions of loading and to other loads where the forces are applied suddenly.

The instrument comprises a clock-driven film or other recording medium movable at a constant velocity, and a recording needle or stylus cooperating with the film and mounted on a central shaft movable in response to an impact or applied force, the movement of the said shaft being resisted by heavy plate washers or springs. The clock mechanism is normally held inoperative until a short time before the application of a sudden force.

Referring now to the annexed drawings, illustrating an instrument embodying the feature of the present invention:

Figure 1 is a front elevation, partly in section, of the recording instrument;

Figure 2 is a top plan view with the top removed;

Figure 3 is a section taken on line 3—3 of Fig. 2; and

Figure 4 is a section taken on line 4—4 of Fig. 2.

Figure 5 is an enlarged side view, partly in section, of details at the top of the main operating shaft.

Referring to these drawings, 2 denotes the exterior casing of the instrument, preferably made of a heat-treated and aged magnesium casting having a protective surface coating. The case 2 is preferably enlarged and elliptically shaped at the top and contains within this oval or like shaped zone 4 the clock work and recording mechanism. Extending upwardly from this elliptical section on either side is a pair of apertured lugs or ears 6, preferably integrally cast with the case 2. A removable connector bolt 8 extending through the two apertured lugs 6, acts as the upper attaching means of the instrument to a suitable support. A locking cap screw 9 is provided for safety on the connector bolt.

Contained within the lower half of casing 2 is a number of heavy, resilient dished-type plate washer springs, or the like 10 of any desired camber and thickness, depending upon the load range to be recorded. These plate washers are made in interchangeable unitary stacks, capable of handling various impact loads, in accordance with the magnitude of the loads being tested. For example, one unit stack will consist of dished-type plate washers, of appropriate camber and thickness, to give a linear, full scale deflection for say a 4,000 lb. load; other stacks would be dimensioned to give linear, full scale deflection, for example, of loads of 7,000 lbs., or 10,000 lbs., 12,000 lbs. or 16,000 lbs., respectively. The plate springs or washers 10 are preferably made of alloy steel which are heat-treated in order to insure maximum resiliency, which is essential due to the extremely heavy loads to be recorded. A heavy load receiving bolt or shaft 12 extends centrally upward through the springs 10 into the casing 2. Shaft 12 extends below and outside the casing 2 and its lower end is threaded. Attached to the upper part of the threaded portion is a lock nut 14 which affords a means of loading the springs 10 lightly. Detachably secured to the lower end of the threaded portion is a lower hanger connector 15, in the shape of an inverted U, comprising a pair of apertured lugs having a connector bolt 16 passing through the apertures. The load or weight which is to be suddenly applied to the instrument, is connected to the bolt 16. For the purpose of safety a locking cap screw 17, and set screws 18 and 19 should be used on the connector bolt 16, lower hanger connector 15 and the lock nut 14, respectively.

Immediately below the spring washers 10 and within the casing 2 is a steel lower guide plate 20 through which the central shaft 12 extends. This guide plate 20, supported on inturned flange 81 of the casing, in addition to acting as a guide for the central shaft, acts also as a support for the springs or washers 10 and as a bottom closure plate for the casing 2. Just above the springs 10 and securely and positively attached to the central shaft 12 is a bearing plate 22, having some clearance from the inner wall of the casing to prevent binding, which plate, upon the sudden application of a load or force to the lower end of the shaft 12, causes the springs to be compressed.

Just above the bearing plate 22 is the upper guide plate 24 through which the central shaft 12 extends, with a small clearance. This plate 24 is shouldered so that its upper part is positioned in a recess in the base of the head or casing 2, its reduced lower part being just above the plate 22, thereby providing a very firm guide for shaft 12. The guide plates 20 and 24 are snugly positioned within the case 2 and around the central shaft 12 and thus when any load is applied even out of line with 12, on the lower connector 16, there will still be an even compression of the springs and the shaft will move smoothly in an up and down direction without jamming.

Referring now to Figs. 2, 3 and 4, a metal supporting or base plate 26 for the clock-work and recording mechanism is secured in the lower part of the casing 2, just above plate 24. Shaft 12 extends through plate 26 with clearance and supports a stylus bridge 28. Bridge 28 could be mounted on the upper end of shaft 12, but the preferred construction is shown in Fig. 5, where a U-shaped bracket 27 is fixed to shaft 12, the arms 29 of the bracket passing through side apertures in plate 26 with clearance, the stylus bridge 28 being mounted on the upper ends of said arms 29. The stylus bridge 28 supports a recording stylus mechanism 30 and stylus needle 31.

Diagrammatically shown in Fig. 1, and in detail in Figs. 2, 3 and 4, is a conventional hand wound clockwork indicated generally at 32, positioned on one end of base plate 26. This clockwork is wound by key 33. In order to start the clock, a release lever 34 is provided, pivoted on bushing 35, the other end of the lever being movable into and out of the path of a usual centrifugal or wind vane governor (not shown) on governor shaft 37, geared to the clockwork, as is well known in constant speed clockwork drives. Release lever 34 is provided with an upstanding finger 38 to which is attached a pull release cord 39. When the cord is pulled, the release lever is moved laterally to release the clock train and allow it to start. A catch may be provided to hold release lever in release position.

The lever 34 moves with considerable friction on its pivot bushing 35, so that a positive force on the cord 34 is required to release the governor shaft 37. In general, a 25 lb. line is attached to the cord 39 so that it will break without exerting too large a force on the lever 34. Other methods of releasing the starting lever depend upon the type of application of the instrument; i. e., the string may be pulled by hand.

The release lever is operated as described, immediately before the application of the impact load to the lower hanger connection to start the drive for the recording film, as will now be described.

The clock mechanism drives gear 40, fixed on shaft 41, which shaft is supported by bracket 41'. Fixed on shaft 41 are upper and lower sprockets 42. Sprockets 42 engage perforations in the edge of a record film or strip 44 and serve to move the strip along past the recording stylus 30, the preferred rate of travel of strip 44 being 3.6 inches in 10 seconds. The record sheet 44 is guided and supported by a main angle plate 50 and a cover or front plate 52 mounted on the supporting plate 26. The front plate 52 has a slot 54 through which the stylus 31 passes, into contact with the record strip 44. A backing plate insert 56 is provided directly opposite the recording stylus 30, in order to provide a proper backing for the stylus. The cover plate 52 has a flange or shelf 58 to provide support for the lower edge of the record strip 44. The top of the film supporting structure has two open recesses 61 near either end into which the downwardly bent ends of a small flat spring 59 extend, for lightly pressing the film against supporting flange 58. A film guide 60 is provided for guiding the record strip around the drive sprocket. A detachable aluminum or Plexiglas cover plate 62 is positioned above the described mechanism.

The strip 44 used in this treatment is preferably clear base film 16 mm. wide with double sprocket holes. It has been found that the scribed amplitudes of movement of the springs per 1000 pounds are between .014 inch and .037 inch, depending upon the size of the spring stack 10. To analyze miniature records of this type, it is necessary to magnify the record by a calibrated microscope or by photographic enlargement on a screen. A tool marker's microscope calibrated in ten-thousandths of an inch with approximately 50 magnification is quite useful. An optical magnification of 23 used for enlarging microfilm records allows visual study for measurements of load and time. The records also may be reproduced by standard photographic enlargement. The two edges of the scribed line thus embossed are extremely sharp even at $200x$ magnification.

An instrument of this type is quite delicate and scribes a very accurate record while dealing with extremely heavy loads. It is necessary that the instrument and some of its parts be calibrated regularly. The following is a procedure of calibration which has been found to be quite accurate. Before calibration, to prevent variations in the equivalent zero load, it is recommended that a dead load of 50 lbs. be applied. In a tensile testing machine, for increments of 500 or 1000 lbs. a short record approximately $\frac{1}{16}$ in. long is made for each load up to the maximum for the range of the springs used. This is accomplished by displacing the starting lever for the shortest possible time. The load is reduced by the same increments. The lock nut or loading collar is fixed by set screws to maintain the 50 lbs. dead load. Testing with several instruments using light plate springs and loads up to 5000 lbs., the average scribed amplitude of movement was found to be .386" per 1000 lbs.

The conventional clock mechanism 32 shown runs for approximately 40 seconds, although by changing small half-ring springs on the weights of the centrifugal governor the mechanism may run for about four (4) minutes. The recording film speed may be from 5 in. in 10 sec. to 5 in. in 30 sec., but in order to get extremely accurate data it is necessary to time the rate of travel of the film. A convenient means of timing this is to measure with a stop watch the time required for the sprocket wheel to make two complete revolutions which is equivalent to 12 frames or 3.6 in. of film travel. For the standard springs, the film speed is approximately 3.6 inches in 10 seconds. At this speed, the time for forces building up to a maximum in 0.01 second may be conveniently measured.

The following is the preferred method of operation, with some precautionary steps:

16 mm. clear base film is used in the instrument. A strip about 7 in. long is trimmed at the entering edge with a slight bevel at the top in order that it may easily be inserted in the film support slot and pass under the film springs at the top. It is usual practice to insert the film so that it curls against the back plate of the film support and will pass under the needle or stylus with the least obstruction. The clock motor is started, and the film is pushed forward until the sprocket teeth engage the sprocket holes on the film. It is usually allowed to pass beyond the sprocket approximately ½ in. before the motor is stopped.

It is desirable to place a zero line on the film; the clock is therefore started and the film allowed to pass under the needle. Simultaneously the sprocket rotation is timed by a stop-watch to determine the interval of time for two revolutions. After the zero line has thus been drawn and the speed observed, the film is again inserted as before and the instrument is ready for use.

Care should be taken that the spring support for the needle is not disturbed since forces applied to the springs will cause permanent deformation. To adjust the stylus for proper recording, the stylus holder may be removed at the base, and the springs deformed forward approximately $\frac{1}{16}$ in. The base is pushed toward the film support, with slight tension on the base screws, until about 60 grams force is exerted on the needle on the film. The pressure of the stylus on the film should emboss a groove, but the pressure should not be great enough as to cause gouging rather than embossing.

If the film strikes the needle and is difficult to insert, the needle may be pulled back slightly (approximately 0.010 in.) to allow the film to pass. If further deformation of the springs occurs, they may be permanently deformed and require readjustment.

To insert the film it is usually convenient to place it in contact with the support slot with the thumb and forefinger of the right hand, and then to push it through the slot with the thumb and forefinger of the left hand. After the film is inserted through the sprocket, it should be wrapped around inside the case in a clock-wise manner to avoid interference with the emerging end of the film as it travels around the interior of the case. The film should be numbered or identified after the zero lines is placed on it, preferably with the instrument number, and the time for two revolutions of the sprocket.

Should the plate washer springs be changed to obtain a different range of force, the case must be heated to about 250° F. so that the guide plates may be withdrawn without scoring the magnesium contact surfaces. This is particularly true during assembly of the copper guide plate in the case. Many parts of the instrument are extremely accurate, and care must be exercised to prevent damage.

The instrument, for example, may be used for recording the force created when a parachute opens and suddenly slows down a freely falling body. The upper connector 6 would be secured to some appropriate part of the parachute. The cargo or body to be dropped would then be secured to the hanger bolt 16. The cargo and parachute are released from the airplane and fall freely until the static line opens the parachute. As the cargo begins to leave the plane, the starting lever cord 39 pulls and then breaks, thus releasing the lever 34 and starting the clock mechanism to drive the film. The film is thus started before the load is applied. The plate springs 10 are deflected by the pull exerted by the load, and the stylus deflected an amount proportional to such load, the travel of the stylus being recorded on the strip 44.

The resiliency of the plate springs 10 resisting the suddenly applied load cause the central shaft to be displaced, the amount of displacement depending upon the number and strength of the springs used. The recording stylus mechanism attached to the upper end of the central shaft 12 then records on the moving film 44 the amplitude of movement of the plate springs created by the suddenly applied load. The stylus will continue to record the displacement as long as the load is applied.

The records obtained by the instrument are in units of force and time. If a sudden shock or impulse is recorded, the equation $$F.T = M.V$$

expresses the equivalence of the reduction in velocity of a moving weight by forces applied for a period of time. The area under the curve recorded by the instrument is equal to the summation of the forces for increments of time. For a given weight which is reduced in speed to a given velocity, the area under the curve is proportional to the relative initial velocity.

A typical force-time curve may be analyzed to determine the equivalent changes in energy. The initial velocity is calculated from the force-time curve area. The change in velocity is proportional to the force exerted per increment of time, and the total velocity for the sum of the increment times determines the distance traversed for that time. The summation of the product of the force and distance is equal to the potential energy exerted by the impulse, and therefore the equivalent kinetic energy change.

While the preferred embodiment of the invention has been described in some detail, it should be understood that the invention is not to be limited to such details, but may be carried out in other ways.

I claim as my invention:

1. An instrument for measuring impact loads, comprising a unitary casing with an enlarged head portion and a portion of smaller diameter extending therefrom, a central shaft, adapted to be connected to an impact load, extending through said smaller portion of the casing, spring means in said smaller portion of the casing and surrounding said shaft, for absorbing and resisting said impact load, a stylus bridge and a stylus in the enlarged part of the casing, operatively connected to said shaft, and means, including clockwork mechanism and strip guides mounted in the enlarged part of the casing, for moving a record strip past the stylus at a predetermined rate, independently of the movement of the stylus.

2. An instrument of the character described, comprising a unitary casing with an enlarged head portion and a portion of smaller diameter extending therefrom, a central shaft, adapted to be connected to an impact load, extending through said smaller portion of the casing, annular, cambered plate springs in said smaller portion of the casing and surrounding said shaft for absorbing and resisting said impact load, a stylus bridge and a stylus in the enlarged part of the casing, operatively connected to said shaft, a base plate positioned in said enlarged part of the casing, and means, including clockwork mechanism and strip guides mounted on said base plate, for moving a record strip past the stylus at a predetermined rate, independently of the movement of the stylus.

3. An instrument for measuring impact loads, comprising a unitary casing with an enlarged head portion and a portion of smaller diameter extending therefrom, a central shaft, adapted to be connected to an impact load, extending through said smaller portion of the casing, annular, cambered plate springs in said smaller portion of the casing and surrounding said shaft for absorbing and resisting said impact load, a stylus bridge and a stylus in the enlarged part of the casing, a base plate positioned in said enlarged part of the casing, connecting means, passing through said base plate, for operatively connecting one end of said shaft to said stylus bridge, and means, including clockwork mechanism and strip guides mounted on said base plate, for moving a record strip past the stylus at a predetermined rate, independently of the movement of the stylus.

JAMES J. RYAN, Jr.

REFERENCES CITED

The following references are of record in the file of this patent:

UNITED STATES PATENTS

| Number | Name | Date |
|---|---|---|
| 361,689 | Giddings | Apr. 26, 1887 |
| 504,286 | Stone | Aug. 29, 1893 |
| 2,020,927 | Arnold et al. | Nov. 12, 1935 |
| 2,390,304 | Hitchen | Dec. 4, 1945 |

FOREIGN PATENTS

| Number | Country | Date |
|---|---|---|
| 827,850 | France | Feb. 2, 1938 |